US 12,493,696 B2

(12) United States Patent
Wang et al.

(10) Patent No.: US 12,493,696 B2
(45) Date of Patent: Dec. 9, 2025

(54) METHOD AND SYSTEM FOR DETECTING VOLUMETRIC ATTACKS USING MULTI-PHASE ANALYSIS OF APPLICATION PROGRAMMING INTERFACE CALLS

(71) Applicant: Harness Inc., San Francisco, CA (US)

(72) Inventors: Jisheng Wang, Palo Alto, CA (US);
Sanjay Nagaraj, Dublin, CA (US);
Min-yi Shen, Palo Alto, CA (US);
Swapnil Kura, Pune (IN)

(73) Assignee: Harness Inc., San Francisco, CA (US)

( * ) Notice: Subject to any disclaimer, the term of this patent is extended or adjusted under 35 U.S.C. 154(b) by 179 days.

(21) Appl. No.: 18/391,721

(22) Filed: Dec. 21, 2023

(65) Prior Publication Data

US 2025/0209170 A1     Jun. 26, 2025

(51) Int. Cl.
*H04L 29/06*     (2006.01)
*G06F 21/55*     (2013.01)
*G06F 21/56*     (2013.01)

(52) U.S. Cl.
CPC .......... *G06F 21/566* (2013.01); *G06F 21/552* (2013.01); *G06F 2221/033* (2013.01)

(58) Field of Classification Search
CPC ... H04L 63/0263; H04L 63/108; H04L 63/20;
H04L 63/10; G06F 21/566; G06F 21/552
See application file for complete search history.

(56) References Cited

U.S. PATENT DOCUMENTS 9,807,092 B1 * 10/2017 Gutzmann .............. H04L 63/20
10,476,899 B2 * 11/2019 Cochin ................. H04L 63/145

* cited by examiner

*Primary Examiner* — Longbit Chai

(57) ABSTRACT

A method for detecting volumetric attacks using multi-phase analysis of API calls is disclosed. The method includes collecting API calls data having API calls to and from protected actors. The method also includes identifying a triggering suspicious time window during which a first set of actors indicate suspicious volume spikes. Further, the method includes performing an API-sequence-based user behavior clustering to identify a subset of the API attack sequence and a second set of actors. Thereafter, the method includes correlating the activities of the second set of actors over a large period of time to identify the complete API attack sequence to extract an attack signature of the complete API attack sequence for detecting potential attacks.

20 Claims, 12 Drawing Sheets

METHOD AND SYSTEM FOR DETECTING VOLUMETRIC ATTACKS USING MULTI-PHASE ANALYSIS OF APPLICATION PROGRAMMING INTERFACE CALLS

BACKGROUND

Technical Field

The present disclosure relates to the field of Application Programming Interface (API) security and particularly relates to a system and method for detecting volumetric attacks using analysis of API calls.

Description of the Related Art

Application Programming Interface (API) security vulnerabilities arise when APIs are inadequately protected against unauthorized access, data breaches, or malicious actions. The APIs can be a security risk during various API calls, such as authentication and authorization, access control, encryption, input validation, error handling, monitoring, and testing. Since inadequately secured APIs can lead to the exposure of sensitive data, unauthorized entry, and threats to the overall security of an enterprise or application, it is essential for overall enterprise or application security to ensure robust API security. It has been observed that the most lethal security attacks, such as Denial of Service (DoS) attacks, and Distributed DoS attacks collectively referred to as volumetric attacks, are conducted by attackers in multiple phases. Attackers may sneak in or identify vulnerabilities in API security, and in the next phase may exploit those vulnerabilities to maximize their gain. Security weaknesses or vulnerabilities that can be exploited by the attackers in multiple stages or phases of an API interaction. Such vulnerabilities are not limited to a single point of entry or a single API call but may span across several steps or stages of an API transaction. Typically, such attacks happen at a second phase when the attacker has already exploited the application and figured out the vulnerability or backdoor in the application for abusive illegal purposes, including fraud, content scraping, sensitive data leakage, or the like. Further, there are normally hundreds, thousands, or even millions of actors used in this phase of the attack which allows the attacker to scale out the attack scope in order to maximize the gain.

There are existing systems, such as a DDoS detection and prevention system, a rate limiter, a firewall, a web security protection policy, etc., for detecting and controlling volumetric attacks. All these systems are designed around monitoring dramatic volume changes in one or two dimensions. For example, if one user sends more than 10 requests per second to an endpoint, the existing system may apply a rate-limiting policy or block such requests. If a request comes from some blacklisted country or IP address, the access can be denied. These systems designed with static policies for detecting and preventing volumetric attacks are not able to capture sophisticated attacks that are carried over a long period of time. It has been observed that the attackers' smarty distributes their attack once they identify a vulnerability. These attackers never use their source IP and instead use thousands of random IPs, which makes some of these rate-limiting policy-based solutions ineffective, as these IPs will not show any history of malicious behavior. If a request comes from an unknown IP or source location, for which there is no historical reputation, based on which the request could be denied, the existing system will consider the request as a genuine request, even though, it may be an attempt to retrieve more data based on the known vulnerability. Existing tools are not able to detect these sophisticated attacks by using independent detection logic, such as reputation logic, volume control logic, etc. as the attacker will not exploit the known vulnerability from an old and repeated IP, or try to gain data in a short period.

Therefore, there is a need for a system and method for detecting sophisticated volumetric attacks for better API security to reduce cumulative impact and mitigate risks of the attack for improving the overall security of the APIs.

BRIEF SUMMARY

One or more embodiments are directed to a method and system for detecting volumetric attacks using multi-phase analysis of application programming interface calls.

The system includes a receiver to collect API call data having a plurality of API calls to and from protected actors. Further, the API calls data also includes the total number of API calls, the total number of successful vs. failed API calls, the total number of unique source users, and/or the total number of unique source countries. The system includes a time-series anomaly detector to identify a triggering suspicious time window during which a first set of actors indicate suspicious volume (e.g., number of calls, number of users, number of failures, number of data access requests, etc.) spikes, a behavior anomaly detector that analyses the suspicious behavior of the first set of actors to identify a subset of API attack sequence and a second set of actors. The second set of actors may be larger than the first set of actors and have similar behavior as the first set of actors. Further, the system includes a cross-actor correlator that correlates activities of the second set of actors over a larger period of time to identify the complete API attack sequence to extract an attack signature of the complete API attack sequence, such that the attack signature is utilized for detecting potential attacks. The system uses this three-stage detection approach to focus first on identifying smaller time windows based on volume spikes, then determines a full list of the first set of actors involved based on behavioral analysis and correlates the activities of the full list of second actors to identify complete attack sequences. This three-stage detection approach helps to increase the signal-to-noise ratio, thereby improving efficiency and accuracy.

In an embodiment, the time-series anomaly detector employs one or more time-series anomaly prediction models to identify triggering suspicious time window during which the first set of actors indicate suspicious volume spikes. It has been observed that there may be one or multiple volume spikes caused at different phases in the collected API calls. The time-sequence anomaly detector is used to identify such volume spikes to identify the triggering suspicious time windows. Further, it may be understood that the first set of actors may, without any limitation, include a user device, a network service, a network device, and an API endpoint. In some embodiments, the one or more time-series anomaly prediction models may include Autoregressive Integrated Moving Average (ARIMA) model, Long Term Short Memory (LTSM) model, and/or Prophet Forecasting Model. The time-series anomaly detector identifies the triggering suspicious time window by historical data analysis, prediction of future values, residual analysis, threshold-based analysis, statistical analysis, seasonality and trend analysis, and/or ensemble analysis.

Further, the time-series anomaly detector identified the triggering suspicious time window based on a minimal baseline window size. The minimal baseline window size is selected based on the stability of baseline patterns and API endpoint access patterns. In an embodiment, the one or more time-series anomaly prediction models utilize feedback loops for retraining, such that anomalies detected in real-time are provided as input for retraining to evolve data patterns and reduce false alarms over time. In an embodiment, the one or more time-series anomaly prediction models also remove anomalies pertaining to the business context of a user that is determined by capturing one or more user feedback and manually excluding them from the baseline to avoid generating similar detections.

In an embodiment, the behavior anomaly detector performs an API-sequence-based user behavior clustering to identify a subset of an API attack sequence and a second set of actors. The second set of actors correspond to API endpoints (e.g., user IDs, service ID, device ID, and source IDs, etc.). The second set of actors may be larger than a first set of actors and may have a similar behavior as the first set of actors. Further, the subset of the API attack sequence and the second set of actors are identified by utilizing a volume and frequency-based peer anomaly detection technique.

In an embodiment, the cross-actor correlator correlates activities of the second set of actors over a large period of time to identify the complete API attack sequence. Further, the activities of the second set of actors may be correlated by using different dimensions of behavior along with the API calls. Further, the cross-actor correlator extracts an attack signature of the complete API attack sequence based on the correlated activities, such that the attack signature is utilized for detecting potential attacks. The extracted attack signature is utilized for the detection of potential attacks and to prevent damages in the future. In an embodiment, the cross-actor correlator determines a potential action to disable a future attack associated with the extracted attack signature. Additionally, the potential action is implemented automatically if magnitude of the associated threat is more than a pre-defined threshold. Accordingly, the IPs that contribute to the attack at the initial phases and sometimes not be visible at the later stages may also be identified through the extracted attack signature and the future attacks may be prevented at the initial phases.

An embodiment of the present disclosure discloses the method for detecting volumetric attacks using multi-phase analysis of the API calls. The method includes the steps of collecting API calls data having a plurality of API calls to and from protector actors. Further, the method includes the steps of identifying a triggering suspicious time window during which a first set of actors indicate suspicious volume spikes by employing one or more time-series prediction models. Also, the method includes the steps of performing an API-sequence-based user behavior clustering to identify a subset of the API attack sequence and a second set of actors. The method further includes the steps of correlating activities of the second set of actors over a large period of time to identify the complete API attack sequence. Thereafter, the method includes the steps of extracting an attack signature of the complete API attack sequence based on the correlated activities, such that the attack signature is utilized for detecting potential attacks. By extracting the attack signature, it is possible to identify the IPs that are responsible for the attack during the early stages and may not be visible in later stages and allow the prevention of future attacks during the initial phases. The activities of the second set of actors may be correlated by using different dimensions of behavior along with the API calls.

In an embodiment, the method also includes the steps of utilizing feedback loops for retraining, such that anomalies detected in real-time are provided as input for retraining to evolve data patterns and reduce false alarms over time. Additionally, the method also includes the steps of removing anomalies pertaining to business context of a user that are determined by capturing one or more user feedback and manually excluding them from baseline to avoid generating similar detections.

The features and advantages of the subject matter here will become more apparent in light of the following detailed description of selected embodiments, as illustrated in the accompanying FIGS. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
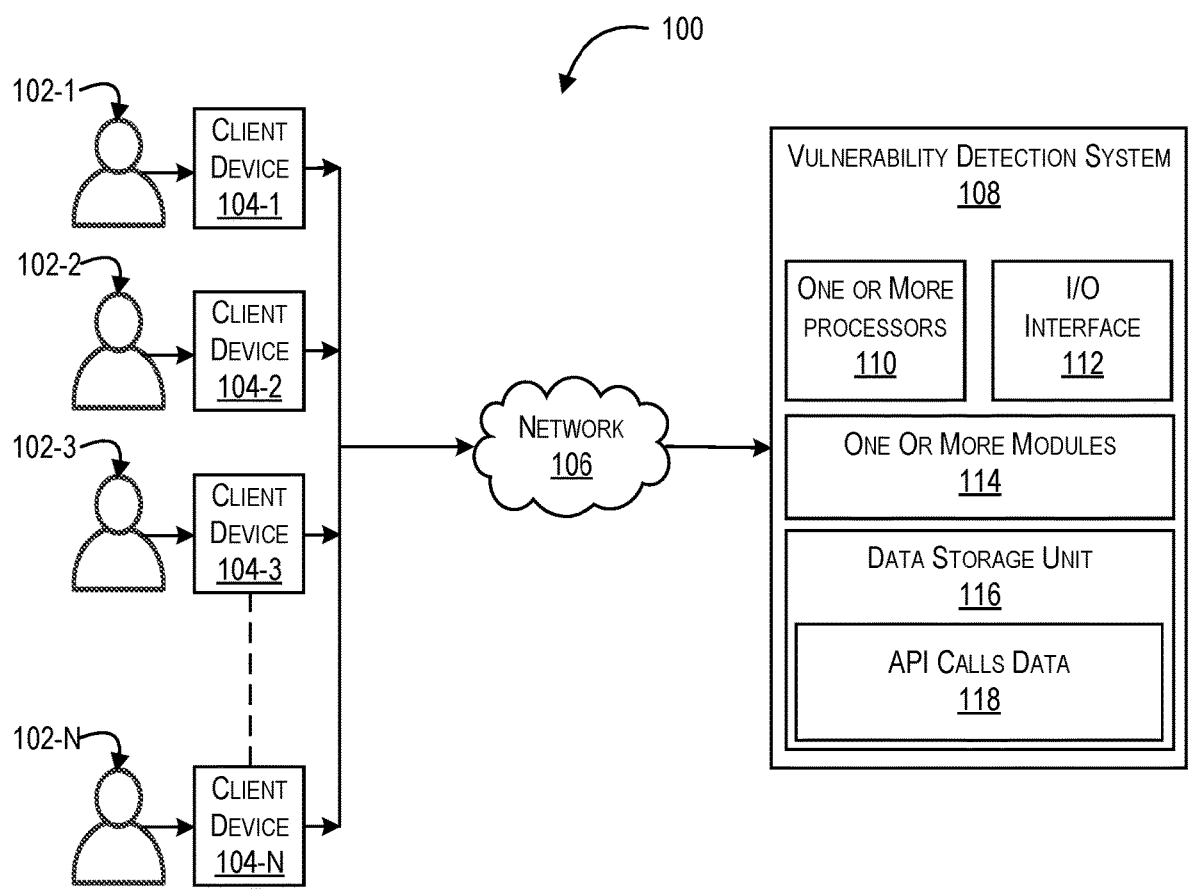
FIG. 1 illustrates an exemplary environment of a system for detecting volumetric attacks using multi-phase analysis of Application Programming Interface (API) calls, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system for detecting volumetric attacks using multi-phase analysis of Application Programming Interface (API) calls. Typically, such vulnerabilities are exploited at a second phase of the API attack chain when the attacker has already exploited the application and figured out the vulnerability or backdoor in the application for abusive or illegal purposes, including fraud, content scraping, sensitive data leakage, or the like. Since the main goal of the attacker at this phase is to scale out the attack scope in order to maximize the gain, there are normally hundreds, thousands, or even millions of actors used in this phase of the attack. Accordingly, such high number of attackers usually cause volumetric spikes which can be used to detect anomalies. Additionally, since most or all of the involved actors are controlled by some automated scripts, they show similar behavior patterns at the API level, and thus behavior patterns can be used to detect anomalies. Further, in some advanced attack cases, attackers sometimes can add noises to obfuscate their behavior, the API sequence is still mostly composed of the relevant API calls for that specific attack, thus one or more smart models can be used to detect such anomalies. In some scenarios, the whole attack sequence can include one or a few phases, with each phase including several APIs. Typically, the API calls for a certain phase may happen pretty fast within a session, but there can be hours or days intervals between different phases, thus the system monitors API calls data across a large interval to detect such patterns and anomalies.

In an embodiment, the system may build the API sequence of each actor over time and utilize a Machine Learning (ML) based clustering approach to find the similarity among actors' behavior. Further, the system may eliminate legitimate outliers from the analysis. For the purpose of the disclosure, the legitimate outliers may correspond to a group of users showing similar behavior which may look suspicious but are totally legitimate within the application context, for example, admin or service account. The system applies a 3-stage detection approach to focus on a smaller time window or a subset of the attack sequence in order to increase the signal-to-noise ratio in the detection. Firstly, the system uses an endpoint-level time series anomaly detection to filter suspicious time windows during which a first set of actors indicate suspicious volume (calls, users, failures) spikes. Once the suspicious time window is identified with corresponding endpoints, the system zooms into the windows to perform the API sequence-based behavior clustering to identify a subset of the attack sequence and also a set of second actors. It may be understood that since these time windows may be the peak of attacks, the signal-to-noise ratio for detecting attacks are normally very high. Upon identifying the set of second actors, the system zooms out to a longer time window to identify the complete attack sequence and extract the signatures among actors at the early attack phase (e.g., phase 1) for future prevention.

The system may include collecting API calls data having a plurality of API calls to and from protected actors. The system may also include employing one or more time-series prediction models to identify a triggering suspicious time window during which a first set of actors indicate suspicious volume spikes. Further, the system performs an API-sequence-based user behavior clustering to identify a subset of an API attack sequence and a second set of actors. Furthermore, the system includes correlating activities of the second set of actors over a large period of time to identify the complete API attack sequence to extract an attack signature of the complete API attack sequence based on the correlated activities, such that the attack signature is utilized for detecting potential attacks. The attack signature may facilitate identification of even the IPs that may be responsible for the attack during the early stages and may not be visible in later stages, thus allowing for the prevention of future attacks during the initial phases.

FIG. 1 illustrates an exemplary environment 100 of a system 108 for detecting volumetric attacks using multi-phase analysis of Application Programming Interface (API) calls, in accordance with an embodiment of the present disclosure. As shown in FIG. 1, the exemplary environment 100 comprises one or more users 102-1, 102-2, 102-3, and 102-N (hereinafter known as user 102), one or more client devices 104-1, 104-2, 104-3, 104-N (hereinafter known as client device 104, or the user device 104), a network 106, and the system 108. The exemplary environment 100 may be established to detect volumetric attacks using multi-phase analysis of the API calls in the enterprise related to one or more resources and/or one or more services. The resources may, without any limitation, include a server, a cloud server, a network, an end-user device, a printer, an access control device, a data storage unit, a processing unit, and other connected devices. The services, without any limitation, include any applications or any software services.

As illustrated, each user 102 of the enterprise may be communicatively coupled to the network 106 through associated client device 104. Any of the user 102 may be a malicious user or any client device 104 may be a device that is used to initiate or conduct an API attack. The network 106 (such as a communication network) may include, without limitation, a direct interconnection, a Local Area Network (LAN), a Wide Area Network (WAN), a wireless network (e.g., using Wireless Application Protocol), the Internet, and the like. In an alternate embodiment, each client device 104 may be communicatively coupled to the system 108 via a corresponding dedicated communication network (not shown in FIG.). The system 108 may be in the premise of the enterprise or part of the network of the enterprise. In an embodiment, the system 108 may be connected to the enterprise through the network 106. In an embodiment, the system 108 may be configured to provide on-demand service or to work as Software as a Service (SaaS), or Platform as a Service (PaaS). In whichever configuration it is used, the system 108 needs to have visibility and access to all the in-bound and out-bound API calls to and from the enterprise. Typically, one or more API calls are generated when different resources or services communicate, either with each other or with one or more components outside the enterprise. The system 108 may monitor/fetch/receive such one or more API calls during and/or after one or more attack sequences to understand the attackers, their patterns, and extract attack signatures of the attack (such as hacking, financial fraud, network attack, exfiltration, or the like) and/or the attacker. Further, the system 108 utilizes such extracted signatures to detect potential attacks in the future. In an embodiment, the system 108 may take suitable actions automatically to mitigate the effects of such attacks in the future. The system 108 has been discussed in detail in conjunction with FIG. 2 in the following paragraphs.

Figure 2:
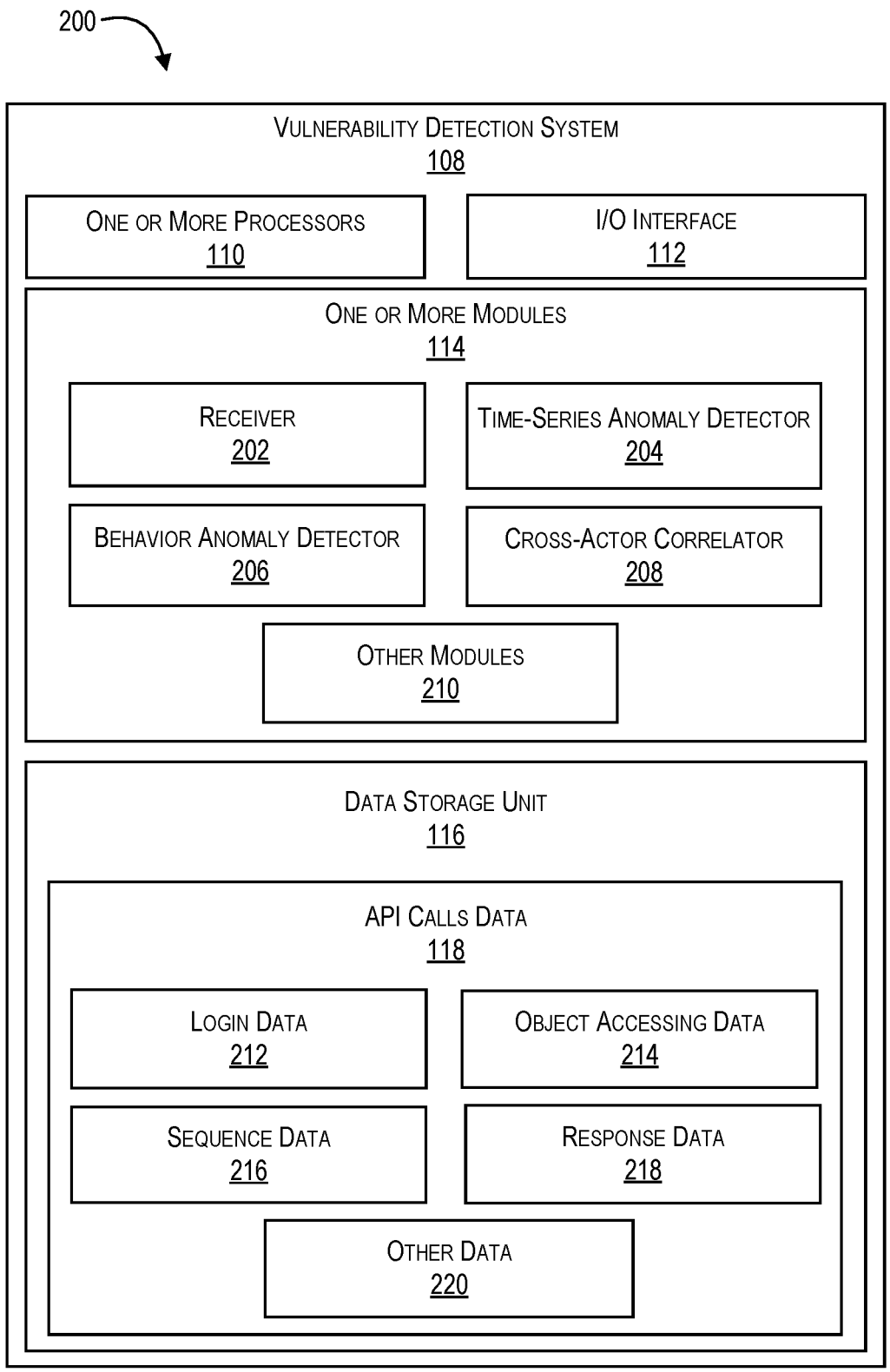
FIG. 2 illustrates a detailed block diagram showing functional modules of the system for detecting volumetric attacks using multi-phase analysis of API calls, in accordance with an embodiment of the present disclosure.

FIG. 2 illustrates a detailed block diagram 200 showing functional modules of the system 108 for detecting volumetric attacks using multi-phase analysis of API calls, in accordance with an embodiment of the present disclosure.

The system 108 may include one or more processors 110, an Input/Output (I/O) interface 112, one or more modules 114, and a data storage unit 116. In some non-limiting embodiments or aspects, the data storage unit 116 may be communicatively coupled to the one or more processors 110. The data storage unit 116 stores instructions, executable by the one or more processors 110, which on execution, may cause the system 108 to extract the attack signature of the attack/attacker and mitigate the effects of such extracted attack signature in the future. In some non-limiting embodiments or aspects, the data storage unit 116 may store API calls data 118. The one or more modules 114 may perform the steps of the present disclosure using the API calls data 118 (whether monitored/or received/or fetched) associated with one or more API calls associated with, for example, login data 212, object accessing data 214, sequence data 216, response data 218, and other data 220. In some non-limiting embodiments or aspects, each of the one or more modules 114 may be a hardware unit, which may be outside the data storage unit 116 and coupled with the system 108. In some non-limiting embodiments or aspects, the system 108 may be implemented in a variety of computing systems, such as a laptop computer, a desktop computer, a Personal Computer (PC), a notebook, a smartphone, a tablet, e-book readers, a server, a network server, a cloud server, and the like. In a non-limiting embodiment, each of the one or more modules 114 may be implemented with a cloud-based server, communicatively coupled with the system 108.

In one implementation, the one or more modules 114 may include, but is not limited to, a receiver 202, a time-series anomaly detector 204, a behavior anomaly detector 206, a cross-actor correlator 208, and one or more other modules 210 associated with the system 108. In some non-limiting embodiments or aspects, the API calls data 118, associated with one or more attack sequences, may be stored in the data storage unit 116. In some non-limiting embodiments or aspects, such data in the data storage unit 116 may be processed by the one or more modules 114 of the system 108. In some non-limiting embodiments or aspects, the one or more modules 114 may be implemented as dedicated units and when implemented in such a manner, the modules may have the functionality defined in the present disclosure to result in novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 114 of the present disclosure control the access to the virtual and real-world environment, such that the system 108 may be utilized to determine fingerprints of attacks/attackers in virtual environments (such as virtual-reality, augmented-reality, or metaverse) similar to the real-world environments that has been focused (for the sake of brevity) in the present disclosure. The one or more modules 114 along with its stored data, may be implemented in any processing system or device for multi-phase vulnerabilities associated with API security. In a non-limiting embodiment, the proposed processing unit may be implemented within a kernel of a computing device for detecting the anomalies associated with the API security. The kernel along with software and hardware modules of said computing device may function and operate to detect multi-phase vulnerabilities associated with the API security threats, originating from any of the user devices 104 and mitigate the effects of them in the future.

In some embodiments, the receiver 202 may collect API calls data having API calls to and from protected actors. Such API calls may be associated with the enterprise (also referred to as a business), such as based on the communication of the one or more components of the enterprise either with each other or with one or more components out of the enterprise. Further, the calls may, without any limitation, include initial authentication, authorization, and one or more Hyper Text Transfer Protocol (HTTP) requests and responses. In a non-limiting example, the one or more API calls are generated whenever a connected user performs any device operation in the enterprise, such as accessing devices, accessing databases, payments, or the like. In another non-limiting example, the one or more API calls are generated when a service performs an action, such as accessing a database, connecting to a network, opening a webpage, connecting to a server, transferring data to the server, downloading data from the server, or the like. In an embodiment, the API calls data may further include a total number of API calls, a total number of successful vs failed API calls, a total number of unique source users, and a total number of unique source countries. In an embodiment, the API calls may be regular API calls and/or may be associated with one or more attack sequences. It may be noted that for the sake of the present disclosure, the attack sequence corresponds to a series of actions performed during an attack for account creation, takeover, login, claim credit, register payment, balance validation, resource abuse, money transfer, or the like.

Figure 3:
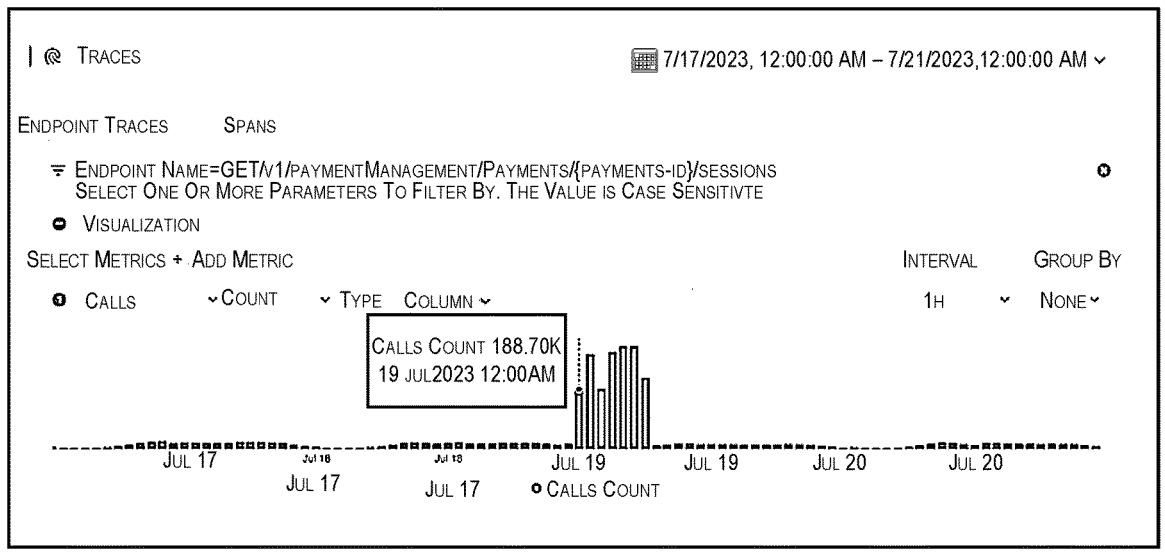
FIG. 3 shows an exemplary user interface showing increased call counts during an attack sequence, in accordance with an embodiment of the present disclosure.

In some embodiment, the time-series anomaly detector 204 may identify a triggering suspicious time window during which a first set of actors indicate suspicious volume spikes. The first set of actors may, without any limitation, include a user device, a network service, a network device, and an API endpoint. Further, such suspicious volume spikes may correspond to suspicious activities, such as sudden increase in API call volume, in at least one of the one or more attack sequences. In order to detect the triggering suspicious time window, the time-series anomaly detector 204 may perform historical data analysis, prediction of future values, residual analysis, threshold-based analysis, statistical analysis, seasonality and trend analysis, ensemble analysis, or a combination thereof. For example, as shown in FIG. 3, an interface 300 shows API calls during a glove distributed payment attack, the API call volume may increase about 10 times during an attack to a payment endpoint which may be detected as an endpoint level anomaly. Further, the time-series anomaly detector 204 may identify one or more suspicious time windows of the detected one or more end-point level anomalies. Such one or more suspicious windows may be identified based at least on a minimal baseline window size. The minimal baseline window size may correspond to a minimal window size that the model may take to baseline the behavior before producing reliable detection. Further, the minimal baseline window size may be selected based on the stability of baseline patterns, API endpoint access patterns, a fixed time (like 3 days or 1 week), or a combination thereof. In an embodiment, the time-series anomaly detector 204 may remove anomalies pertaining to business context of a user that are determined by capturing one or more user feedback and manually excluding them from the baseline to avoid generating similar detections. Accordingly, the system 108 may remove legitimate outliers (i.e., a group of users showing similar behavior which may look suspicious but are totally legitimate within the application context, for example, admin or service accounts) during analysis. In an embodiment, the time-series anomaly detector 204 may utilize feedback loops for retraining, such that the anomalies detected in real-time are provided as input for retraining to evolve data patterns and reduce false alarms over time.

Further, the time-series anomaly detector 204 may, without any limitation, employ one or more time-series prediction models to identify the suspicious time window. In an embodiment, the one or more time-series prediction model may be an Autoregressive Integrated Moving Average (ARIMA). ARIMA may allow simple and lightweight solutions but may be limited in terms of capturing long-term patterns and supporting multi-dimensional featuring prediction. In another embodiment, the one or more time-series prediction model may be a Long-Term Short Memory (LTSM). LSTM may allow accurate capturing of both temporal (multi-layer over long time) and spatial (high-dimensional feature relationship) patterns, but may require heavy load in both training and prediction. In an embodiment, the one or more time-series prediction model may be a Prophet Forecasting Model (PCM). PCM may be light-weight in both training and predicting, suitable for streaming prediction, good at dealing with seasonality patterns and random noise but may not support multi-dimensional feature prediction.

Since sudden volumetric increase targeting one or a certain number of API endpoints may be indicative for potential attacks, but it may also have high false positives due to certain legitimate reasons, for example, marketing campaign, promotion, new service launch etc. Therefore, once the system 108 detects endpoint-level anomaly, the system 108 needs to further perform the user level behavior analysis to confirm the actual attack intention and behavior. Such user level behavior analysis may be performed by the behavior anomaly detector 206.

Figure 4:
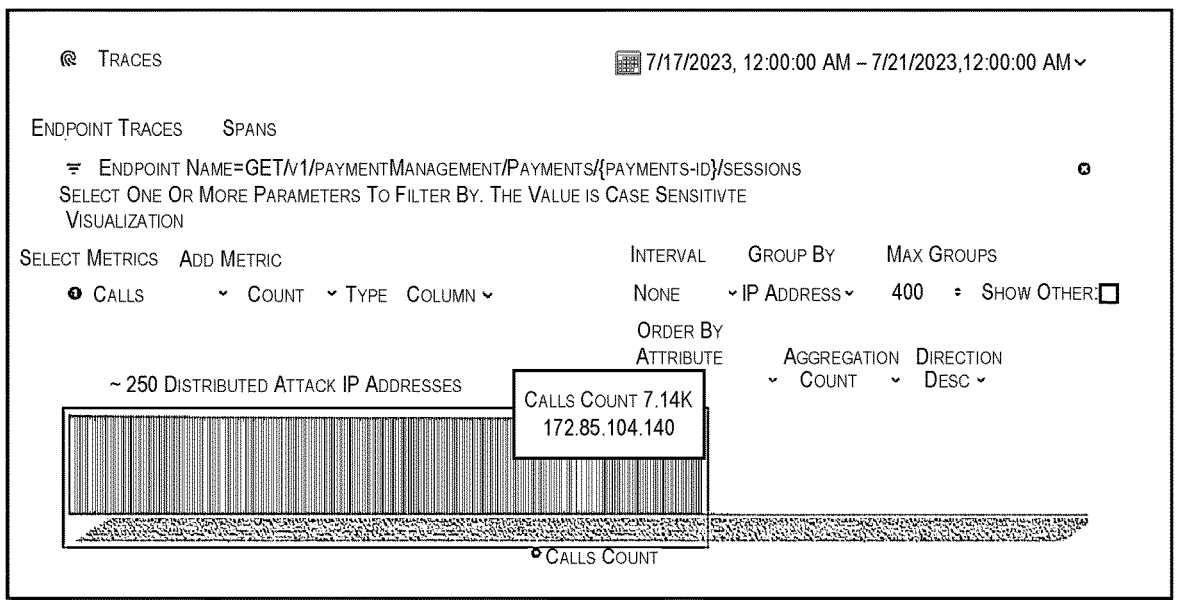
FIG. 4 shows an exemplary user interface showing suspicious actors with noticeably higher API call volume, in accordance with an embodiment of the present disclosure.
Figure 5:
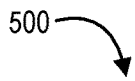
FIG. 5 shows an exemplary user interface showing enumeration pattern of the attack, in accordance with an embodiment of the present disclosure.

In some embodiments, the behavior anomaly detector 206 may perform an API-sequence-based user behavior clustering on the identified suspicious time window to identify a subset of the API attack sequence and a second set of actors. The second set of actors may correspond to user IDs and/or source IDs with user agents, that may be larger than the first set of actors and may have similar behavior as the first set of actors. In an embodiment, the subset of the API attack sequences and the second set of actors are identified by utilizing a volume and frequency-based peer anomaly detection technique. For example, as shown in FIG. 4, an interface 400 shows there are about 250 unique IP addresses which may be observed with noticeably higher API call volume than other normal users and the top actors here may be detected with simple volume and frequency-based peer anomaly detection approach. Further, the behavior anomaly detector 206 may perform user-level behavior analysis during the corresponding attack sequence for each of the identified second set of actors to determine the attack pattern. In an embodiment, once the top attack actors contributing most to the volume increase of the API endpoint are identified, the behavior anomaly detector 206 may determine the attack patterns by building logic for each of the popular attack patterns for adding context information for user-facing detections. It may be observed in the volumetric attacks that once an individual actor is identified then enumeration pattern may be detected by comparing the variations over different API calls from the same actor. Such variations may be parameters in request URL, request header, or request body, as shown in a user interface 500 of FIG. 5. In one exemplary scenario, the enumeration pattern may correspond to credential stuffing that may be targeted for logic endpoints, and enumerating different user credentials e.g., username, password, token, or the like at a high frequency rate. In another exemplary scenario, the enumeration pattern may correspond to targeting vulnerable API endpoints which can return sensitive user or business information. In some embodiments, to maximize the success rate and gain, most volumetric attacks may be conducted in a distributed manner involving hundreds, thousands, or even hundreds of thousands of actors from different source IP addresses. Thus, it may be beneficial to correlate such actors together into the same threat incident to give the user a holistic view of the scope and progress of the attack.

In an embodiment, the cross-actor correlator 208 may correlate the activities of the second set of actors over a large period of time to identify the complete API attack sequence to extract an attack signature of the complete API attack sequence. The correlation may be performed by using different dimensions of behavior including API sequences (both the API endpoints and also the intervals between different API calls), request header, request body, user agent, cookies, or the like. Further, the extracted attack signature may be utilized for early detection of potential attacks in the future to prevent damages. In an embodiment, the cross-actor correlator 208 may further determine a potential action to disable a future attack associated with the extracted attack signature. Further, the potential action may be implemented automatically if magnitude of the associated threat is more than a pre-defined threshold.

Figure 6A:
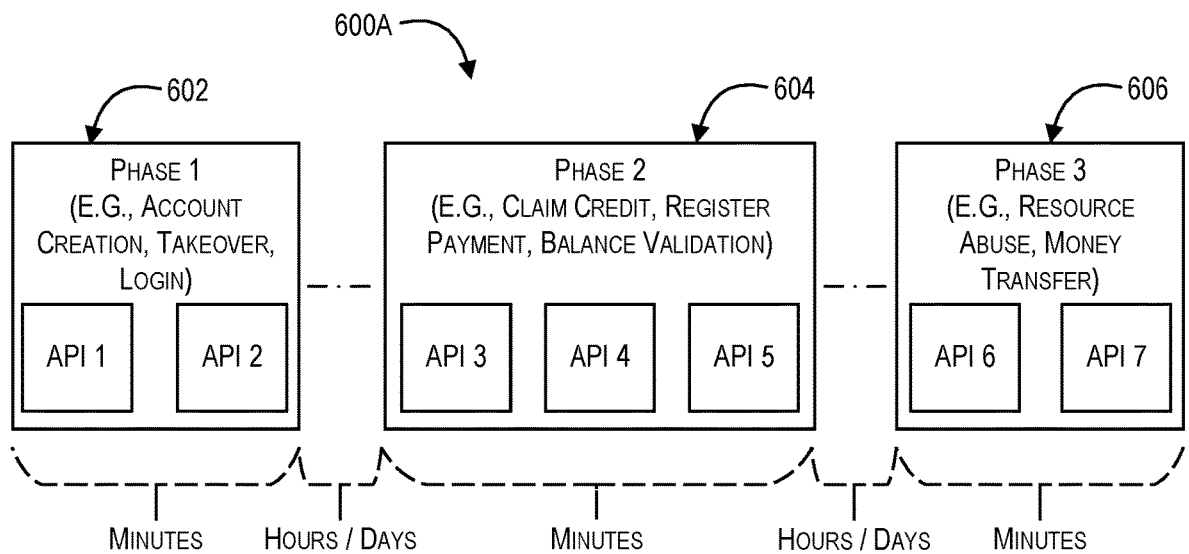
FIG. 6A shows an attack sequence for application fraud or abuse, in accordance with an embodiment of the present disclosure.
Figure 6B:
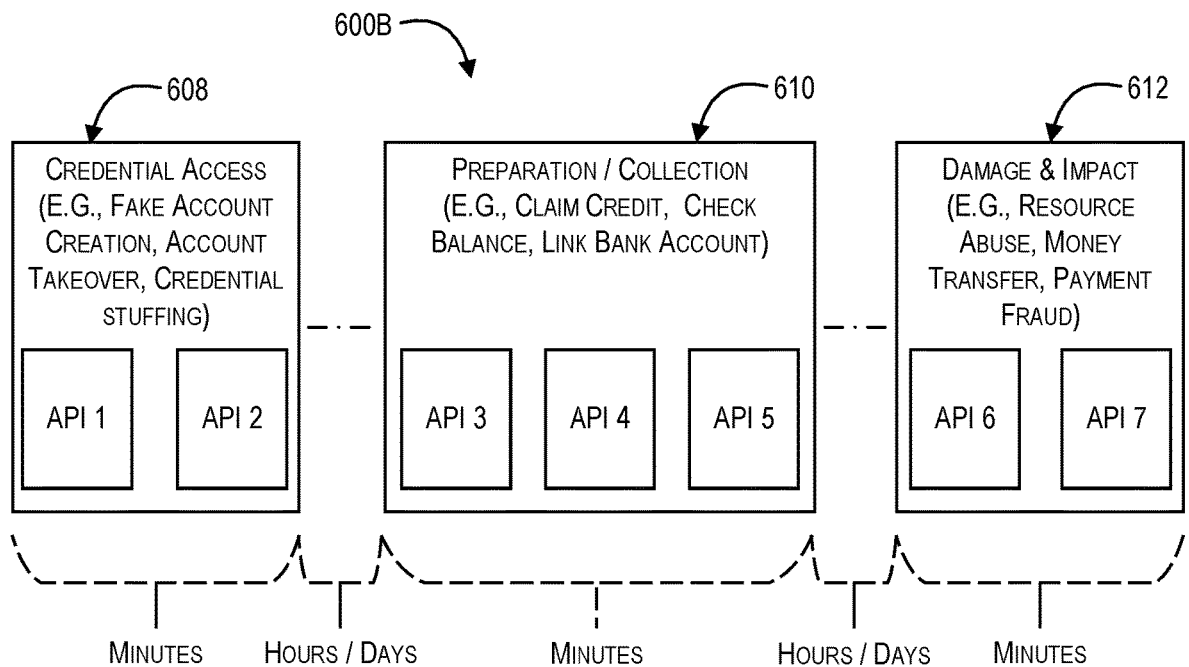
FIG. 6B shows an exemplary "MITRE ATT&CK" for application fraud or abuse, in accordance with an embodiment of the present disclosure.

FIG. 6A shows an attack sequence 600A for application fraud or abuse, in accordance with an embodiment of the present disclosure. FIG. 6B shows an exemplary "MITRE ATT&CK" 600B for application fraud or abuse, in accordance with an embodiment of the present disclosure. For the sake of brevity, FIGS. 6A and 6B have been explained together.

In an embodiment, the attack sequence 600A may be distributed into different phases like phase 1 602 (for example, account creation and takeover login), phase 2 604 (for example, claim register payment, and balance validation), and phase 3 606 (for example, resource abuse and money transfer). In an exemplary embodiment, as shown in FIG. 6B, in the MITRE Adversarial Tactics, Techniques, and Common Knowledge (ATT&CK), such phase 1 may correspond to credential access (for example, fake account creation, account takeover, and credential stuffing) 608, phase 2 may correspond to preparation/collection (for example, claim credit, check balance 610, and link band account), and phase 3 may correspond to damage and input (for example, resource abuse, money transfer, and payment fraud) 612. Further, it may be noted that in a distributed attack such phases may last for only a few minutes and there may be a gap of hours or even days between two consecutive phases. In one scenario, such different phases of the attack sequence 600A may be handled by same IPs. In such a scenario, since such IPs are only directly responsible for the attack during the detection phase, they are typically detected by the existing systems and blocked to prevent damage. In another scenario, such different phases of attack sequences 600A may be distributed among multiple different IPs, such that the IPs that may be involved in the initial phases of attack may not actually be visible during the detection phase at the later stage. Thus, the existing systems fails to block such IPs that may not be visible during the detection phase and are unable to control the damage.

On the other hand, the disclosed system 108 for detecting volumetric attacks using multi-phase analysis of API calls may be configured to first determine a triggering window based on the one or more spikes caused at different phases across the attack sequence 600A. Then, the system 108 may move into a detection phase to zoom in the API sequence-based user behavior clustering to identify a subset of the attack sequence and also a group of suspicious actors. Once the suspicious group of actors is identified, the system 108 may enter prevention phase to zoom out to a longer time window to identify the complete attack sequence. Thereafter, the system 108 may enter a auto fingerprinting phase to extract the signature among actors at the early attack phase (e.g., phase 1 602) for detecting potential attacks. The extracted attack signature may facilitate the system 108 to identify even the IPs that may be responsible for the attack during the early stages and may not be visible in later stages, thus allowing for the prevention of future attacks during the initial phases.

Figure 7A:
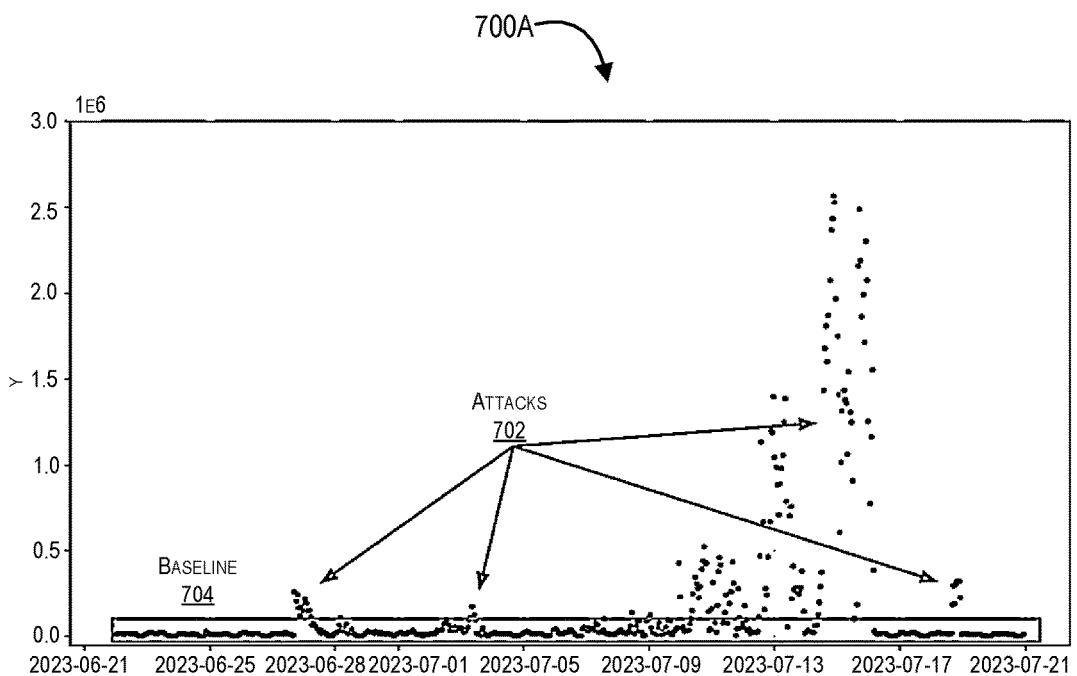
FIG. 7A shows an exemplary graph showing Globe Enum attack, in accordance with an embodiment of the present disclosure.
Figure 7B:
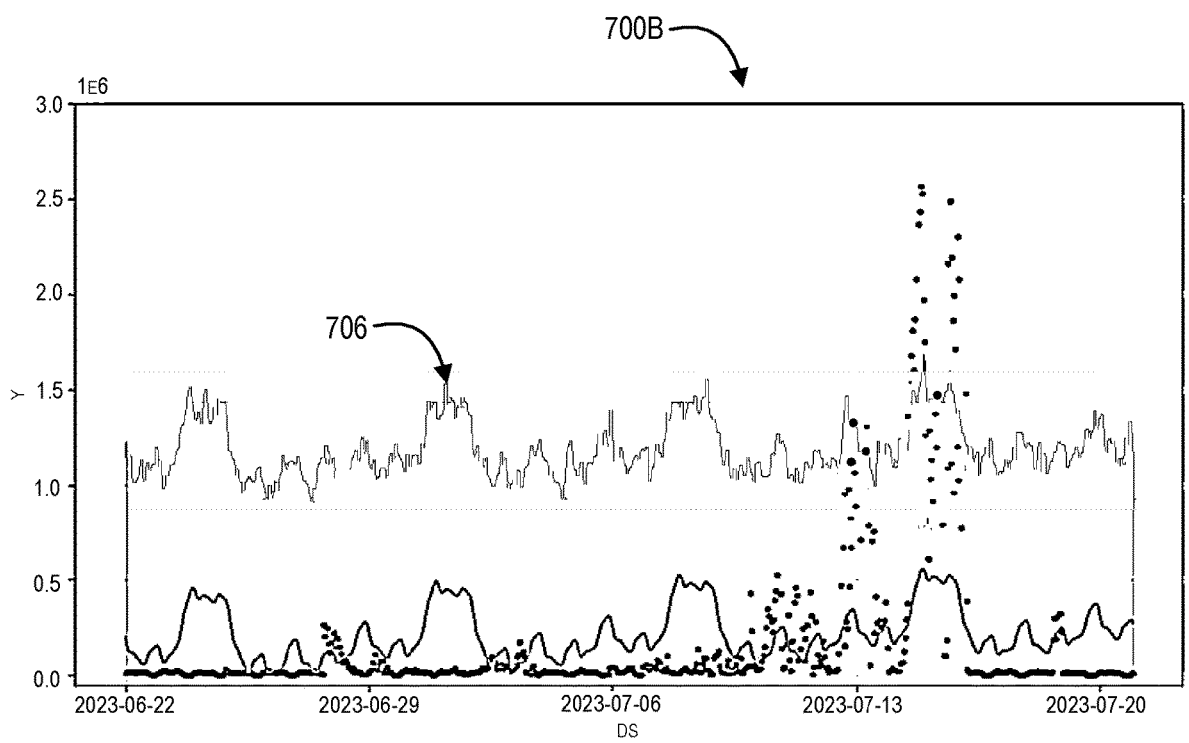
FIG. 7B shows an exemplary graph with estimated trend line and uncertainties, in accordance with an embodiment of the present disclosure.
Figure 7C:
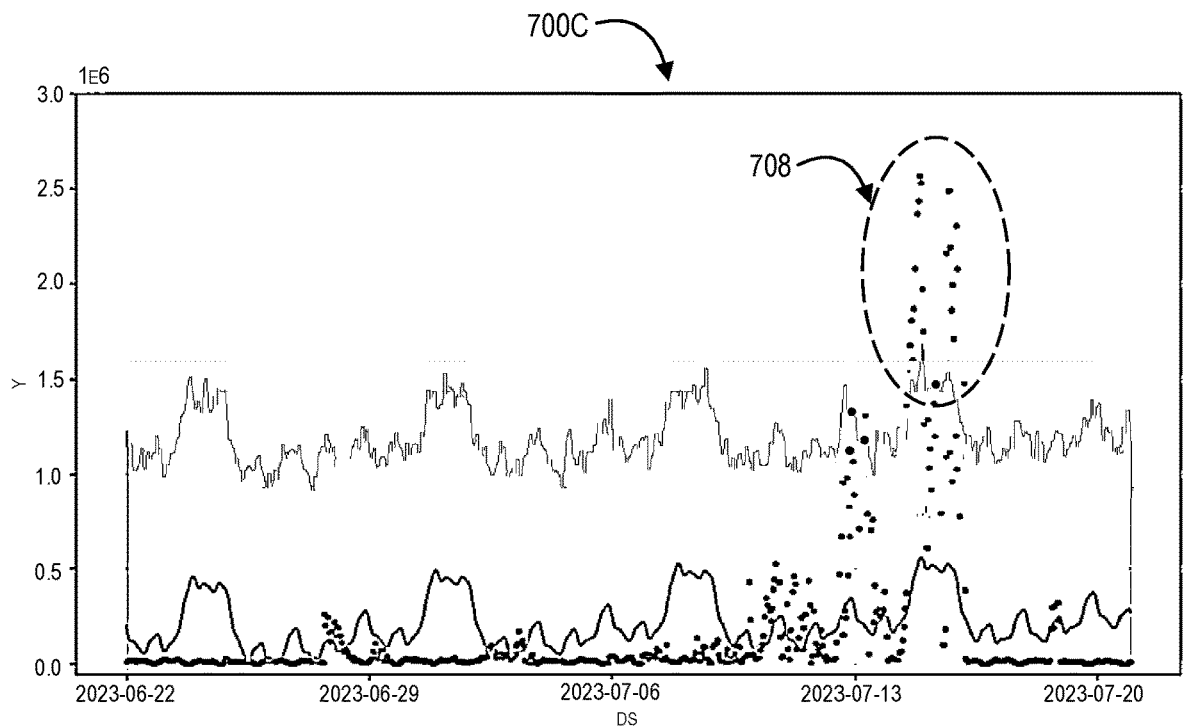
FIG. 7C shows an exemplary graph with selected baseline-skewing outliers, in accordance with an embodiment of the present disclosure.
Figure 7D:
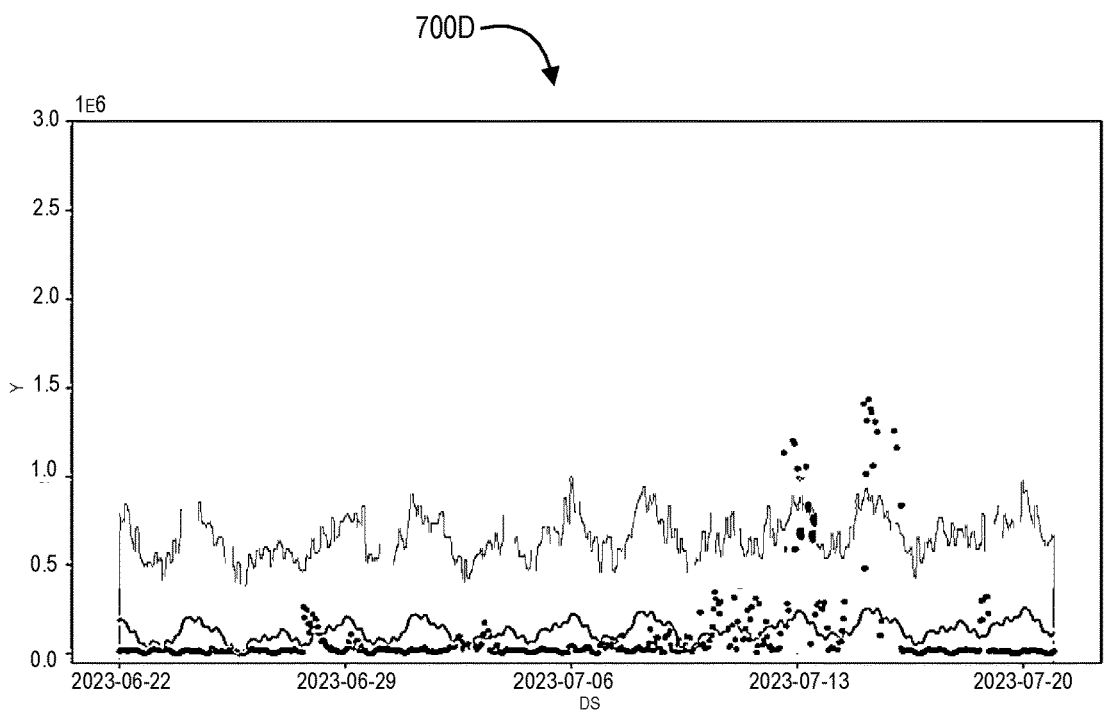
FIG. 7D shows an exemplary graph with removed baseline-skewing outliers, in accordance with an embodiment of the present disclosure.
Figure 7E:
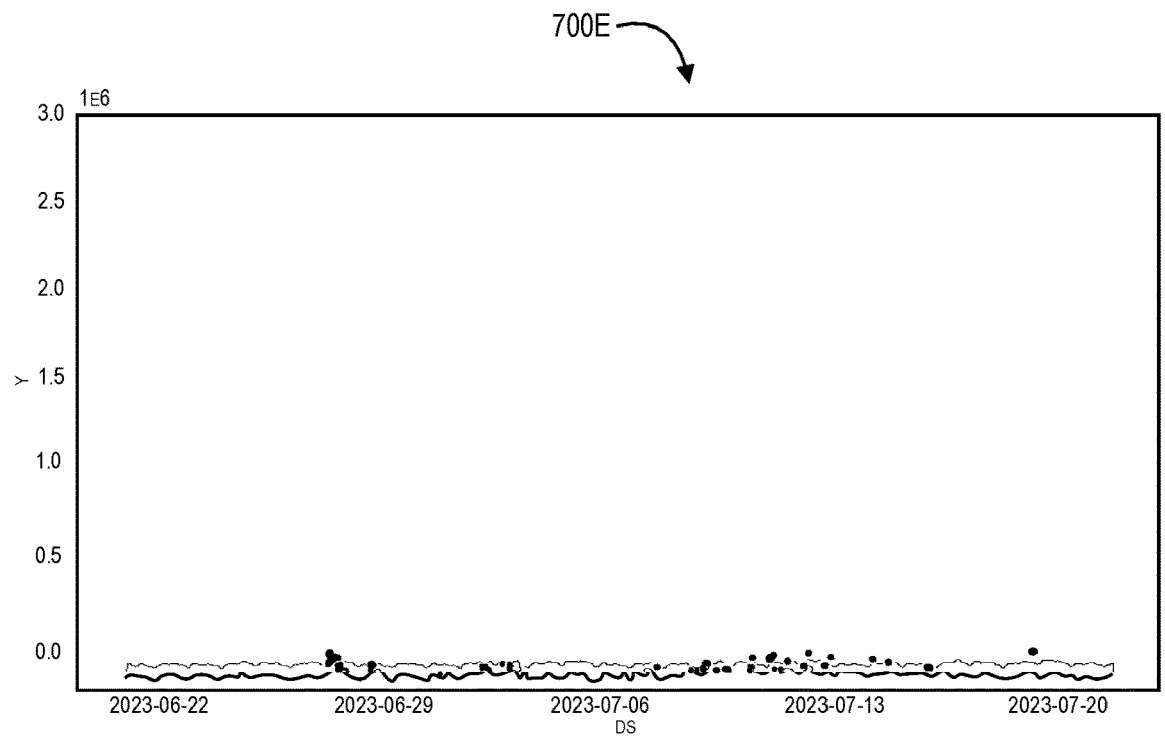
FIG. 7E shows an exemplary graph in steady state where no new significant outliers can be found, in accordance with an embodiment of the present disclosure.
Figure 7F:
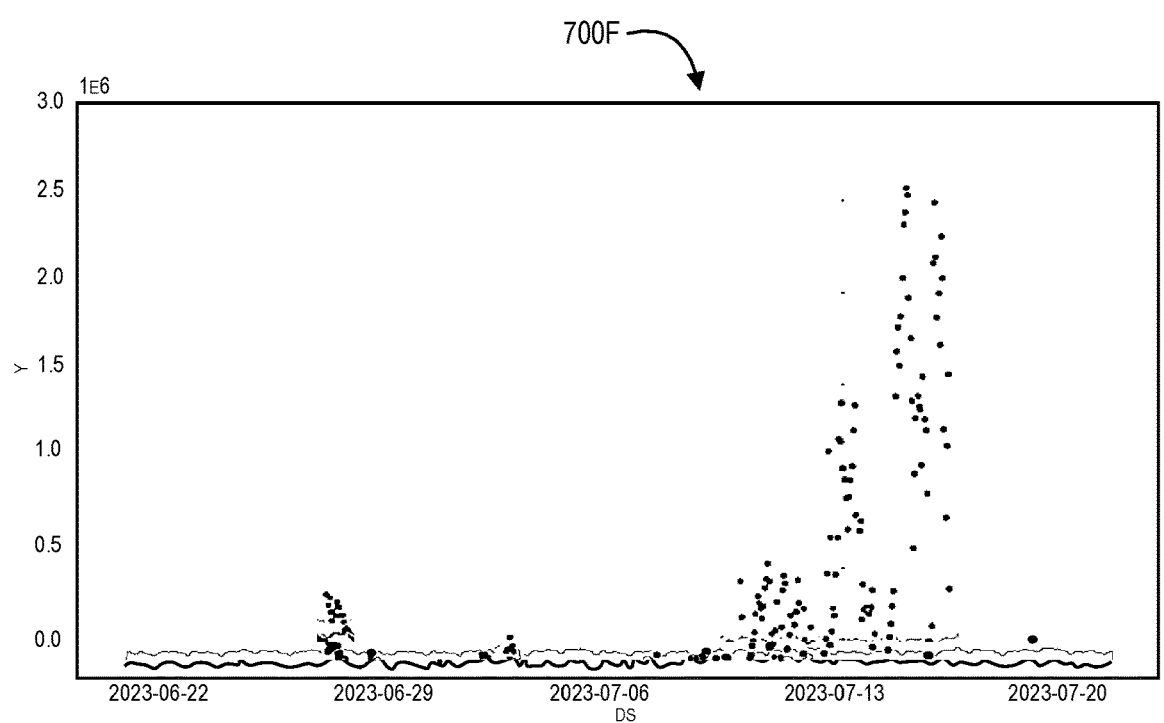
FIG. 7F shows an exemplary graph with all data points inserted back with clearly visible anomalies, in accordance with an embodiment of the present disclosure.
Figure 7G:
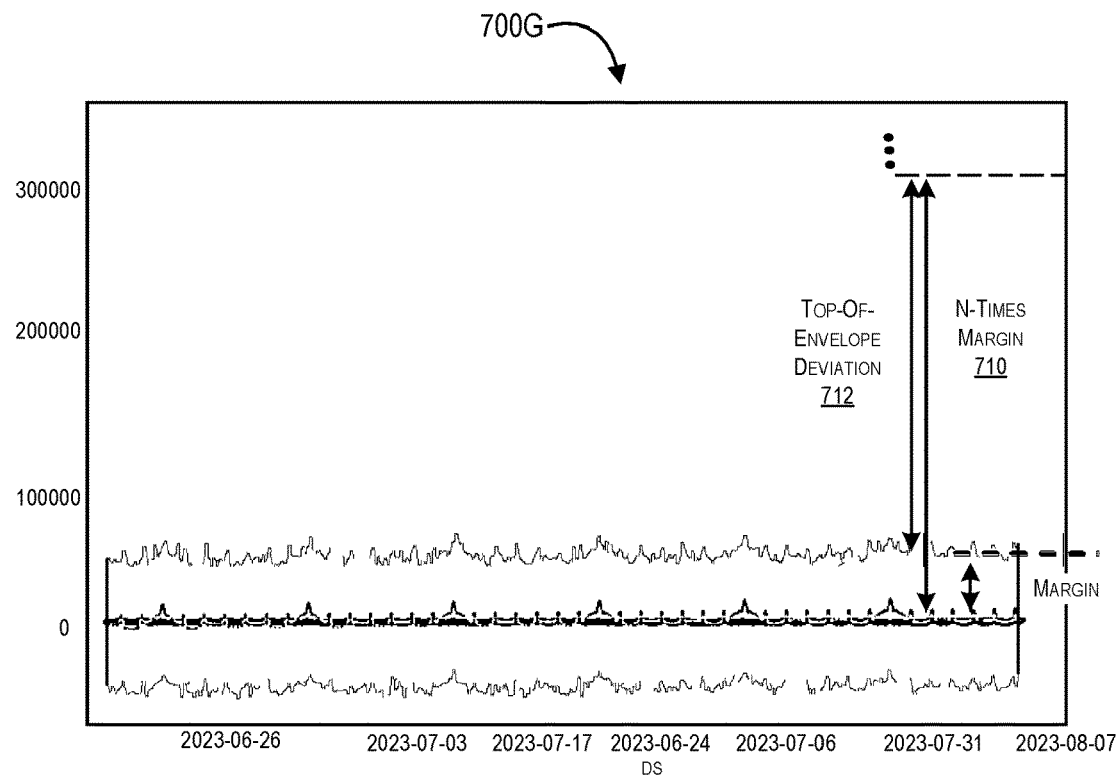
FIG. 7G shows an exemplary graph showing anomaly detection of a time series, in accordance with an embodiment of the present disclosure.
Figure 7H:
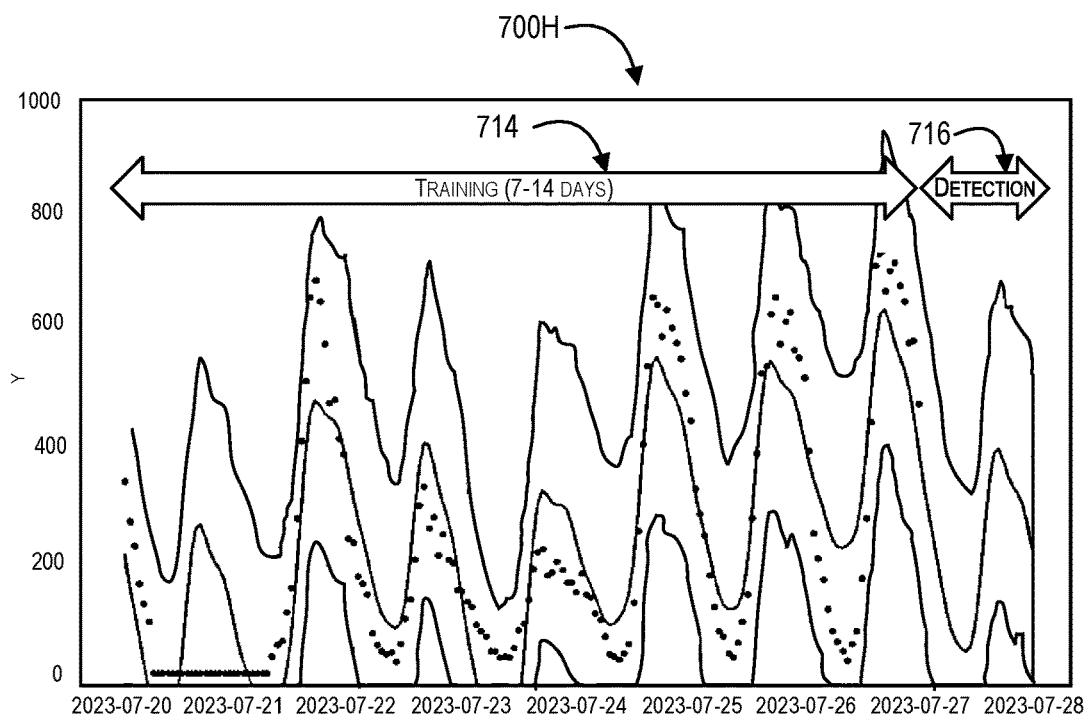
FIG. 7H shows an exemplary graph showing splitting between training and detection data, in accordance with an embodiment of the present disclosure.
Figure 7I:
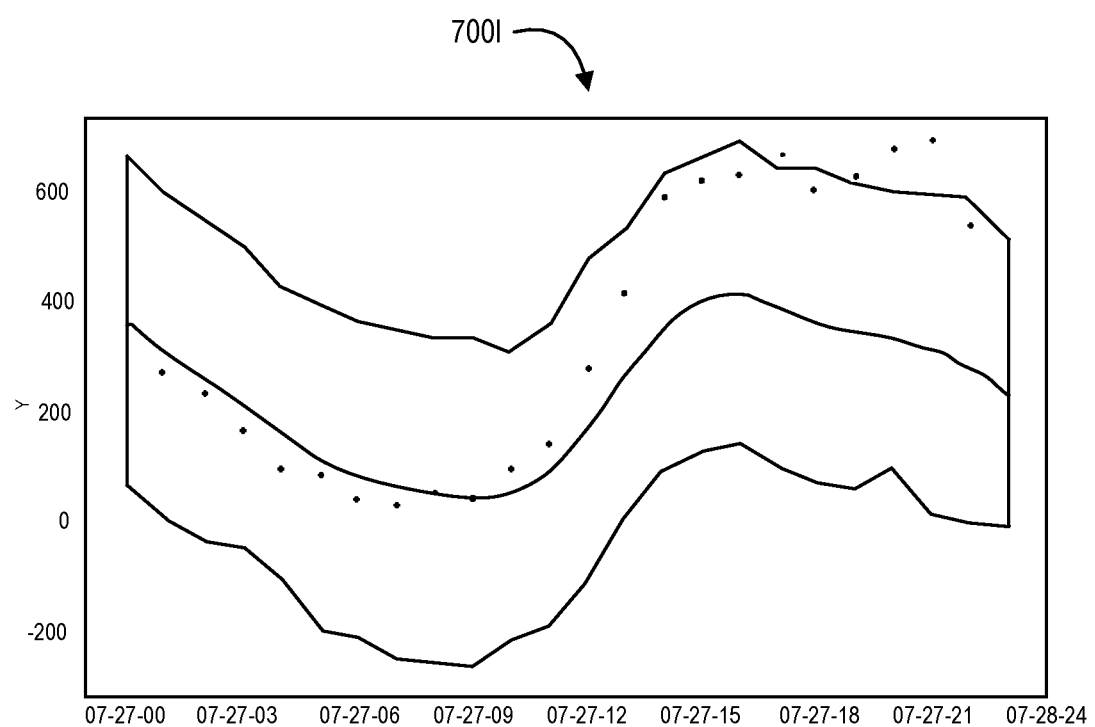
FIG. 7I shows an exemplary graph showing time series prediction with very few insignificant outliers, in accordance with an embodiment of the present disclosure.

FIG. 7A shows an exemplary graph 700A showing Globe Enum attack, in accordance with an embodiment of the present disclosure. FIG. 7B shows an exemplary graph 700B with estimated trend line and uncertainties, in accordance with an embodiment of the present disclosure. FIG. 7C shows an exemplary graph 700C with selected baseline-skewing outliers, in accordance with an embodiment of the present disclosure. FIG. 7D shows an exemplary graph 700D with removed baseline-skewing outliers, in accordance with an embodiment of the present disclosure. FIG. 7E shows an exemplary graph 700E in steady state where no new significant outliers can be found, in accordance with an embodiment of the present disclosure. FIG. 7F shows an exemplary graph 700F with all data points inserted back with clearly visible anomalies, in accordance with an embodiment of the present disclosure. FIG. 7G shows an exemplary graph 700G showing anomaly detection of a time series, in accordance with an embodiment of the present disclosure. FIG. 7H shows an exemplary graph 700H showing splitting between training and detection data, in accordance with an embodiment of the present disclosure. FIG. 7I shows an exemplary graph 700I showing time series prediction with very few insignificant outliers, in accordance with an embodiment of the present disclosure. For the sake of brevity, FIGS. 7A-7I have been explained together.

In an embodiment, to increase the stability of the time series model in case of the presence of active attack 702 or sporadic outliers, the system 108 utilizes an iterative algorithm for baseline estimation, as explained through a graphical example of Globe Enum attack in FIG. 7A. As illustrated, the payment API may have 4+ surges in one month, 3 of them are like ~10× which is the normal volume (since normally it is about 20K) and 1 has greater than 100× in volume (up to 2.5 M/hour), thus the bottom ripples may be the baselines 704, such that 4 surges may be seen easily. However, the time series model may estimate the trend line and the uncertainties, as shown in FIG. 7B. As illustrated, the uncertainty bands, as shown by 706, may be greatly amplified by the 100× surge, the trend line may be skewed and nowhere close to the actual baseline (a lot of imaginary seasonality may be created by the shock) which may leave most of the attacks undetected. Thus, the system 108 may iteratively clean up the baseline-skewing outliers and retrain the time series model by removing such points 708, as shown in FIG. 7C, from the training set and retaining the time-series model. Accordingly, the trend line and the uncertainty bound may both get a bit more reasonable, as shown in FIG. 7D. Further, after 5 cycles of iteration, the model may converge to a steady state, as shown in FIG. 7E, where no new significant outliers may be found. Thus, all the data points may be inserted back to make the 4 attacks/anomalies clearly visible, as shown in FIG. 7F.

In an exemplary embodiment, the anomaly detections of a time series (which can be call volume, failures, unique path parameters, or the like) may be measured in a way similar to the Z-scores in statistics, as shown in FIG. 7G. As illustrated, a deviation from trend line is measured as the multiples of the margin 710 which is similar to the standard deviation in 1-dimensional distribution. Further, the deviation 712 may be normalized by the margin 710. It may be understood that, the outlier is shown to be about 6 times the margin for illustrative purposes but may be actually be larger than 6 times. In the illustrated setting an outlier is only counted as an outlier if it is greater than 8 times the margin, however such parameter may be fine-tuned at any point of time without departing from the scope of the disclosure. Another deviation that the model may keep track of is the absolute deviation (in green). This deviation needs to be greater than a fixed value (currently 200) and the criteria may be set in place here to make sure there is no "outlier" that is only off by like 20 calls, thus insignificant.

In an exemplary embodiment, as shown in FIG. 7H, for each API endpoint, the model may use 7-14 days of time series data to train the model (with iterative filtering), as shown by 714. The model usually has relatively good tolerance to short-term data loss, like what is shown here on July 20th. Further, the 8th day (July 27th) may be the detection day 716 that may not be included in the training set 714. For each endpoint, the time series may be trained once a day to produce the forecast for the next 24 hours. In such 24 hours, the observation may start to populate the far-right side of the plot, generating the confidence score on the fly. Then, when the model starts populating the observations into the detection day (July 27th, not in training set), as shown in FIG. 7I in a zoomed-up version of the far-right side of the plot and filled up with data points. As illustrated, for such endpoint, the time series prediction accurately forecasts the actual call volume, with a few insignificant outliers that are at most 1.1-1.2× of the margin and thus cannot be counted as outliers.

Figure 8:
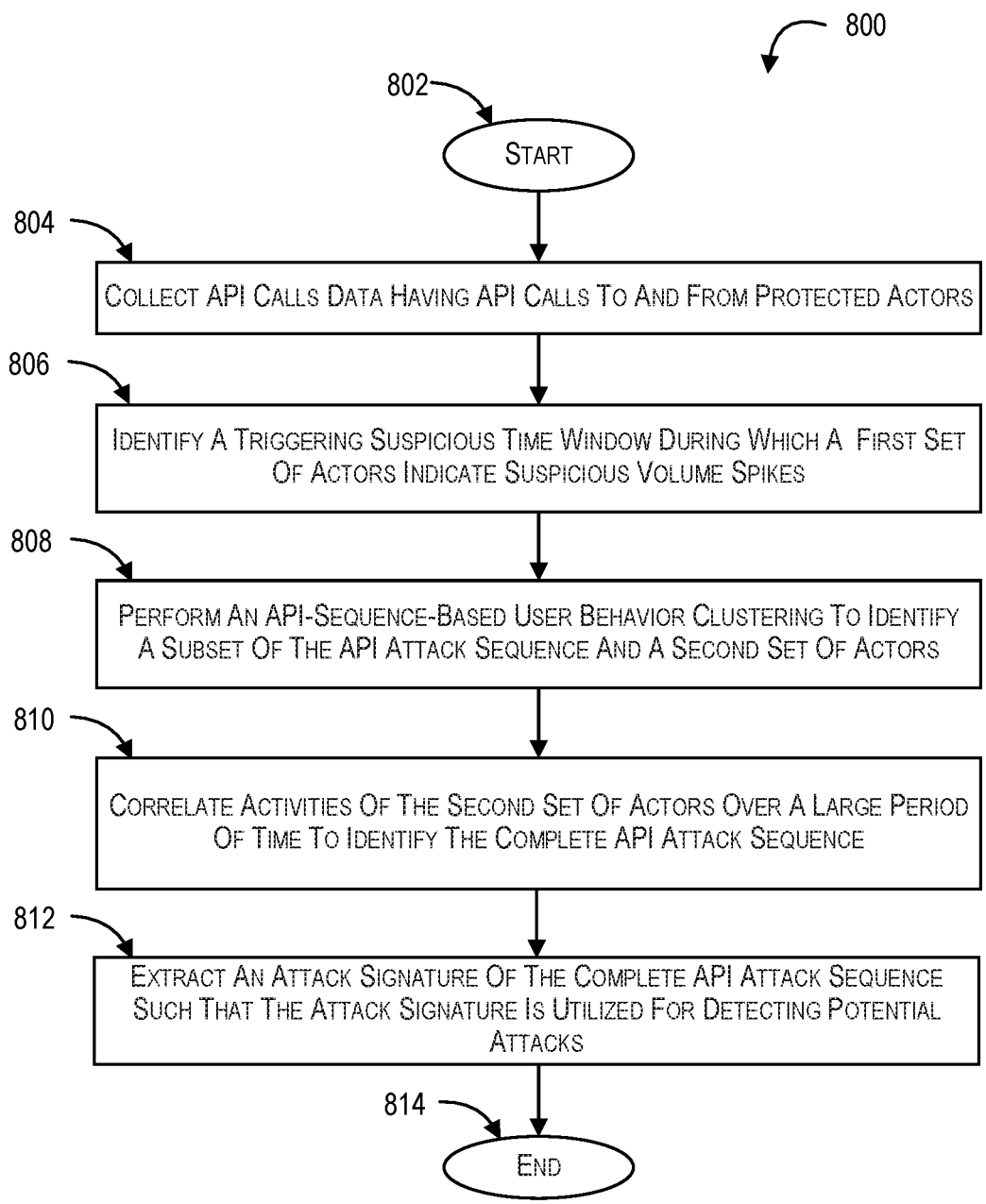
FIG. 8 is a flow chart of a method for detecting volumetric attacks using multi-phase analysis of API calls, in accordance with an embodiment of the present disclosure.

FIG. 8 is a flow chart of a method 800 for detecting volumetric attacks using multi-phase analysis of API calls, in accordance with an embodiment of the present disclosure. The method starts at step 802.

At first, API calls data having API calls to and from protected actors may be collected, at step 804. The API calls data may also, without any limitation, include a total number of API calls, total number of successful vs failed API calls, total number of unique source users, and total number of unique source countries.

Next, a triggering suspicious time window during which a first set of actors (such as a user device, a network service, a network device, and an API endpoint) indicate suspicious volume spikes may be identified by employing one or more time-series prediction models, at step 806. In an embodiment, the one or more time-series prediction models may, without any limitation, include Autoregressive Integrated Moving Average (ARIMA), Long Term Short Memory (LTSM), and Prophet Forecasting Model. In an embodiment, the triggering suspicious time window may be identified by, without any limitation, historical data analysis, prediction of future values, residual analysis, threshold-based analysis, statistical analysis, seasonality and trend analysis, and/or ensemble analysis. Further, the suspicious volume may be due to number of calls, number of users, number of failures, and/or number of data access requests. In an embodiment, the one or more time-series prediction models may utilize feedback loops for retraining, such that the anomalies detected in real-time may be provided as input for retraining to evolve data patterns and reduce false alarms over time. In an embodiment, the one or more time-series prediction models may further remove anomalies pertaining to business context of a user that may be determined by capturing one or more user feedback and manually excluding them from baseline to avoid generating similar detections. In an embodiment, the triggering suspicious time window may be identified based on a minimal baseline window size that is selected based on the stability of baseline patterns, API endpoint access patterns, or a combination thereof.

Next, an API-sequence-based user behavior clustering may be performed to identify a subset of the API attack sequence and a second set of actors, at step 808. The second set of actors may, without any limitation, correspond to user IDs and source IDs with user agents, that contribute most during the volumetric anomaly of API endpoints. Further, the subset of the API attack sequences and the second set of actors may be identified by utilizing a volume and frequency-based peer anomaly detection technique. Further, the second set of actors may be larger than the first set of actors and have similar behavior as the first set of actors.

Next, activities of the second set of actors may be correlated over a large period of time, at step 810, to identify the complete API attack sequence by using different dimensions of behavior along with the API calls. Further, an attack signature of the complete API attack sequence may be extracted, at step 812, based on the correlated activities. Such extracted attack signatures may be utilized for the detection of potential attacks. The method may further include the steps of determining a potential action to disable a future attack associated with the formed fingerprint. Further, the potential action may be implemented automatically if magnitude of the associated threat is more than a predefined threshold. The method ends at step 814.

Figure 9:
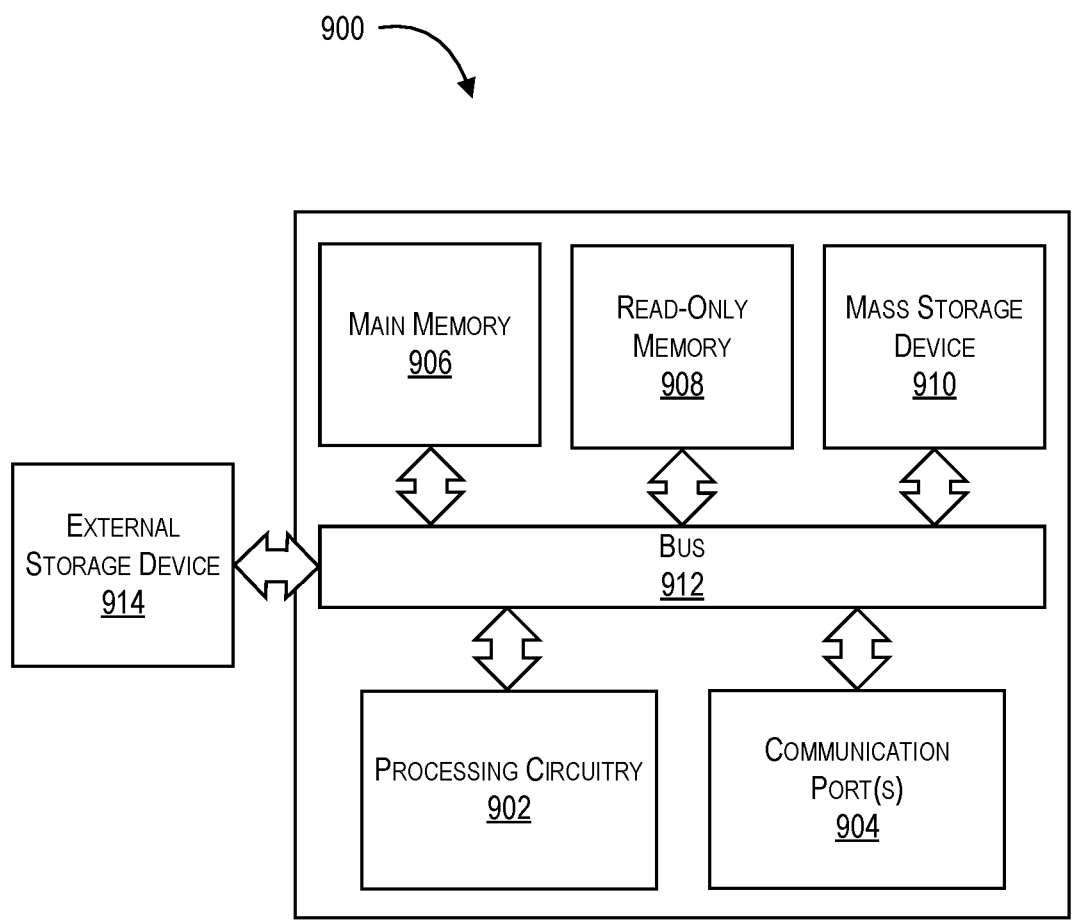
FIG. 9 illustrates an exemplary computer unit in which or with which embodiments of the present disclosure may be utilized.

FIG. 9 illustrates an exemplary computer system in which or with which embodiments of the present disclosure may be utilized. As shown in FIG. 9, a computer system 900 includes an external storage device 914, a bus 912, a main memory 906, a read-only memory 908, a mass storage device 910, a communication port 904, and a processor 902.

Those skilled in the art will appreciate that computer system 900 may include more than one processor 902 and communication ports 904. Examples of processor 902 include, but are not limited to, an Intel® Itanium® or Itanium 2 processor(s), or AMD® Opteron® or Athlon MP® processor(s), Motorola® lines of processors, FortiSOC™ system on chip processors or other future processors. The processor 902 may include various modules associated with embodiments of the present disclosure.

The communication port 904 can be any of an RS-232 port for use with a modem-based dialup connection, a 10/100 Ethernet port, a Gigabit or 10 Gigabit port using copper or fiber, a serial port, a parallel port, or other existing or future ports. The communication port 904 may be chosen depending on a network, such as a Local Area Network (LAN), Wide Area Network (WAN), or any network to which the computer system connects.

The memory 906 can be Random Access Memory (RAM), or any other dynamic storage device commonly known in the art. Read-Only Memory can be any static storage device(s) e.g., but not limited to, a Programmable Read-Only Memory (PROM) chips for storing static information e.g., start-up or BIOS instructions for processor 902.

The mass storage 910 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 912 communicatively couples processor(s) 902 with the other memory, storage, and communication blocks. The bus 912 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 902 to a software system.

Optionally, operator and administrative interfaces, e.g., a display, keyboard, and a cursor control device, may also be coupled to bus 904 to support direct operator interaction with the computer system. Other operator and administrative interfaces can be provided through network connections connected through communication port 904. An external storage device 910 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

What is claimed is:

1. A system for detecting volumetric attacks using multi-phase analysis of Application Programming Interface (API) calls, the system comprises:
    one or more processor devices;
    a receiver, using the one or more processor devices, to collect the API calls data having the collected API calls to and from protected actors;
    a time-series anomaly detector, employing one or more time-series prediction models of a trend analysis, to identify a triggering suspicious time window during which a first set of actors indicate suspicious time windows of volume spikes by using an endpoint-level anomaly detection analysis;
    a behavior anomaly detector to perform an API-sequence-based user behavior clustering, once the suspicious time window is identified, to identify a subset of an API attack sequence and a second set of actors; and
    a cross-actor correlator to:
        correlate activities of the second set of actors by zooming out to a large period of time window to identify a complete API attack sequence; and
        extract an attack signature of the identified complete API attack sequence based on correlated activities from the cross-actor correlator, such that the attack signature can be utilized for detecting potential attacks at an early attack phase.

2. The system as claimed in claim 1, wherein the first set of actors includes at least one of: a user device, a network service, a network device, and an API endpoint.

3. The system as claimed in claim 1, wherein the second set of actors are larger than the first set of actors and have similar behavior as the first set of actors.

4. The system as claimed in claim 1, wherein the suspicious volume may be associated with at least one of: number of calls, number of users, number of failures, and number of data access requests.

5. The system as claimed in claim 1, wherein the API calls data further includes at least one of: a total number of API calls, total number of successful vs failed API calls, total number of unique source users, and total number of unique sources countries.

6. The system as claimed in claim 1, wherein the triggering suspicious time window is identified by at least one of: historical data analysis, prediction of future values, residual analysis, threshold-based analysis, statistical analysis, seasonality and trend analysis, and ensemble analysis.

7. The system as claimed in claim 1, wherein the one or more time-series prediction models utilize feedback loops for retraining, such that anomalies detected in real-time are provided as input for retraining to evolve data patterns and reducing false alarms over time.

8. The system as claimed in claim 1, wherein the one or more time-series prediction models further remove anomalies pertaining to business context of a user that are determined by capturing one or more user feedback and manually excluding them from baseline to avoid generating similar detections.

9. The system as claimed in claim 1, wherein the triggering suspicious time window identified based on a minimal baseline window size that is selected based at least on one of: stability of baseline patterns and API endpoint access patterns.

10. The system as claimed in claim 1, wherein the one or more time-series prediction models include at least one of: Autoregressive Integrated Moving Average (ARIMA), Long Term Short Memory (LTSM), and Prophet Forecasting Model.

11. The system as claimed in claim 1, wherein the subset of the API attack sequence and the second set of actors are identified by utilizing a volume and frequency-based peer anomaly detection technique.

12. The system as claimed in claim 1, wherein the cross-actor correlator correlates the activities of the second set of actors by using different dimensions of behavior along with the API calls.

13. A method for detecting volumetric attacks using multi-phase analysis of Application Programming Interface (API) calls, the method comprises:
    collecting the API calls data having collected API calls to and from protected actors;
    identifying, by employing one or more time-series prediction models of a trend analysis, a triggering suspicious time window during which a first set of actors indicate suspicious time windows of volume spikes by using an endpoint-level anomaly detection analysis;
    performing an API-sequence-based user behavior clustering, once the suspicious time window is identified, to identify a subset of the API attack sequence and a second set of actors;
    correlating activities of the second set of actors by zooming out to a large period of time window to identify a complete API attack sequence; and
    extracting an attack signature of the identified complete API attack sequence based on correlated activities from the cross-actor correlator, such that the attack signature can be utilized for detecting potential attacks at an early attack phase.

14. The method as claimed in claim 13,
    wherein the first set of actors includes at least one of: a user device, a network service, a network device, and an API endpoint;
    wherein the second set of actors are larger than the first set of actors and have similar behavior as the first set of actors;
    wherein the suspicious volume may be associated with at least one of: number of calls, number of users, number of failures, and number of data access requests;
    wherein the API calls data further includes at least one of: a total number of API calls, total number of successful vs failed API calls, total number of unique source users, and total number of unique sources countries.

15. The method as claimed in claim 13, wherein the triggering suspicious time window is identified by at least one of: historical data analysis, prediction of future values, residual analysis, threshold-based analysis, statistical analysis, seasonality and trend analysis, and ensemble analysis.

16. The method as claimed in claim 13, further comprises utilizing feedback loops for retraining, such that anomalies detected in real-time are provided as input for retraining to evolve data patterns and reducing false alarms over time.

17. The method as claimed in claim 13, further comprises removing anomalies pertaining to business context of a user that are determined by capturing one or more user feedback and manually excluding them from baseline to avoid generating similar detections.

18. The method as claimed in claim 13, wherein the triggering suspicious time window identified based on a minimal baseline window size that is selected based at least on one of: stability of baseline patterns and API endpoint access patterns.

19. The method as claimed in claim 13, wherein the one or more time-series prediction models include at least one of: Autoregressive Integrated Moving Average (ARIMA), Long Term Short Memory (LTSM), and Prophet Forecasting Model.

20. The method as claimed in claim 13, further comprises correlating the activities of the second set of actors by using different dimensions of behavior along with the API calls.

\* \* \* \* \*